(12) United States Patent
Starke et al.

(10) Patent No.: US 10,689,020 B2
(45) Date of Patent: Jun. 23, 2020

(54) DOCKING STATION AND MOTOR VEHICLE AND STROLLER

(71) Applicant: FORD GLOBAL TECHNOLOGIES, LLC, Dearborn, MI (US)

(72) Inventors: Carsten Starke, VM Vaals (NL); Thomas Baranowski, Wuerselen NRW (DE); Markus Franzen, Stolberg NRW (DE); Stefan Wolter, Wuerselen NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/005,189

(22) Filed: Jun. 11, 2018

(65) Prior Publication Data

US 2018/0362063 A1 Dec. 20, 2018

(30) Foreign Application Priority Data

Jun. 14, 2017 (DE) .................. 10 2017 210 039

(51) Int. Cl.
| | |
|---|---|
| *B62B 5/00* | (2006.01) |
| *B62B 9/00* | (2006.01) |
| *B60P 1/43* | (2006.01) |
| *B60R 16/03* | (2006.01) |
| *B60R 11/00* | (2006.01) |
| *B60P 3/06* | (2006.01) |

(52) U.S. Cl.
CPC ............ *B62B 5/0003* (2013.01); *B62B 9/00* (2013.01); *B60P 1/43* (2013.01); *B60P 3/06* (2013.01); *B60R 16/03* (2013.01); *B60R 2011/0029* (2013.01)

(58) Field of Classification Search
CPC ............ B62B 5/0003; B62B 9/00; B60P 1/43
See application file for complete search history.

(56) References Cited

U.S. PATENT DOCUMENTS

| 1,835,840 A | 5/1929 | Barclay |
| 4,541,511 A | 9/1985 | Muller |
| (Continued) | | |

FOREIGN PATENT DOCUMENTS

| DE | 10319404 A1 | 11/2004 |
| DE | 202014101281 U1 | 4/2014 |
| (Continued) | | |

OTHER PUBLICATIONS

"Dahl Docking System," Dahl Engineering, http://www.dahlengineering.dk/uk/products/dahldockingsystem2, accessed Feb. 28, 2017, 2 pages.

(Continued)

*Primary Examiner* — Faye M Fleming
(74) *Attorney, Agent, or Firm* — Brooks Kushman P.C.; Brandon Hicks

(57) ABSTRACT

A docking station to be fastened in a motor vehicle is provided to receive a stroller, such as for example a baby carriage. A stroller, which is compatible with the docking station, is additionally provided. The docking station includes an electrical connection, and the stroller is able to be connected, via the electrical connection, to an on-board power supply of the motor vehicle. The docking station is configured to provide the motor vehicle with information about a mounting status and/or docking status.

20 Claims, 2 Drawing Sheets

(56) References Cited

U.S. PATENT DOCUMENTS

| | | | |
|---|---|---|---|
| 5,259,081 A | 11/1993 | Henderson | |
| 5,628,595 A * | 5/1997 | Harris | |
| 6,729,829 B2 * | 5/2004 | Zimmer | A61G 3/02 |
| | | | 296/65.04 |
| 7,410,212 B2 * | 8/2008 | Lawrence | B60N 2/002 |
| | | | 297/217.3 |
| 8,920,082 B2 | 12/2014 | Bryant et al. | |
| 9,724,252 B2 * | 8/2017 | Nishiyama | A61G 3/061 |
| 2018/0009341 A1 * | 1/2018 | Carlile | B60N 2/2848 |

FOREIGN PATENT DOCUMENTS

| | | |
|---|---|---|
| JP | 2005132202 A | 5/2005 |
| WO | 2011160667 A1 | 12/2011 |

OTHER PUBLICATIONS

DE Examination Report DE 102017210039.7 dated Dec. 4, 2019, 6 pages.

* cited by examiner

DOCKING STATION AND MOTOR VEHICLE AND STROLLER

CROSS-REFERENCE TO RELATED APPLICATIONS

This application claims foreign priority benefits under 35 U.S.C. § 119(a)-(d) to DE Application 10 2017 210 039.7 filed Jun. 14, 2017, which is hereby incorporated by reference in its entirety.

TECHNICAL FIELD

The present disclosure relates to a docking station to be fastened in a motor vehicle for receiving a stroller, such as in particular a baby carriage.

BACKGROUND

WO 2011160667 A1 discloses a mounting, a baby carriage being able to be releasably fastened thereby in a motor vehicle instead of an individual seat. The motor vehicle in this case is provided on a floor surface of a passenger compartment with a plurality of individual seat fasteners that, in each case, comprise a receiving recess and at least one latching element. The mounting comprises at least one support profile, at least one floor anchoring device being arranged thereon so as to face downwardly, said floor anchoring device having a latching device that is complementary to the latching element in order to provide a releasable latching engagement. The mounting further comprises at least one upwardly facing mounting bracket that is arranged on the support profile and comprises a clasping element, wherein the clasping element is configured to clasp a frame element of the baby carriage in a retained manner.

SUMMARY

The object of the present disclosure is to provide a docking station, a motor vehicle comprising said docking station and a stroller, in order to improve handling and transport of the stroller in the motor vehicle.

The docking station according to the disclosure comprises a fastening device that fastens the docking station to a seat receiver of a motor vehicle. The docking station additionally comprises a receiving apparatus that is configured to receive a stroller.

Thus, it is advantageously possible to integrate the docking station in a motor vehicle instead of a seat, and, via the docking station, receive and securely transport a stroller, in particular a baby carriage, without said stroller having to be previously dismantled and/or folded up. This simplifies transport of the stroller and saves time. In the case of a baby carriage, the transported child is able to remain in the baby carriage during a journey in the motor vehicle.

The fastening device of the docking station is configured, in particular, to be fastened to a seat receiver that comprises at least one seat rail.

Thus, the docking station is advantageously suitable for motor vehicle models that have such a seat receiver, in particular for compact motor vehicle models.

In a further advantageous embodiment of the docking station according to the disclosure, said docking station comprises an electrical connection, the stroller being able to be connected thereby to an on-board power supply of the motor vehicle.

Thus, it is advantageously possible to supply an electrical device of the stroller with electrical energy. Thus, in particular, a rechargeable battery of the stroller may be charged up when transported in the motor vehicle.

In a further advantageous embodiment of the docking station according to the disclosure, said docking station is configured to provide the motor vehicle with information about its mounting status and/or docking status.

Thus, it is advantageously possible for the motor vehicle to be able to identify whether the docking station is mounted and/or whether a stroller is docked. A control unit of the motor vehicle, therefore, may be adapted to a mounting status and/or docking status of the docking station. Thus, for example, an airbag control unit may be adapted such that a passenger airbag is deactivated when the docking station is mounted and/or when a stroller is docked onto the docking station. Moreover, the motor vehicle control unit may be adapted in this case such that the motor vehicle prompts a driver to adopt a smoother driving mode, for example with a more moderate uptake of gas. A noise level of a radio or similar comfort features could also be adapted.

In all embodiments, the docking station according to the disclosure is preferably integrated in a motor vehicle. The motor vehicle according to the disclosure comprises a passenger compartment, at least one seat receiver being arranged therein that receives a passenger seat. The docking station is mounted on the seat receiver.

Thus, the motor vehicle is equipped with the docking station. A stroller having the aforementioned advantages may be transported, therefore, in the motor vehicle in a simple manner.

In an advantageous embodiment of the motor vehicle according to the disclosure, the docking station is arranged on a passenger seat of the motor vehicle.

Thus, the stroller fastened in the docking station may be easily reached by the driver. Particularly when the stroller is a baby carriage in which a child is carried, the child is located within a reach of the driver of the motor vehicle.

In a further advantageous embodiment of the motor vehicle according to the disclosure, the docking station is connected to an on-board power supply of the motor vehicle.

Thus, it is advantageously possible to supply electrical energy to a stroller that is docked onto the docking station.

In a further advantageous embodiment of the motor vehicle according to the disclosure, the motor vehicle comprises a ramp that is able to be brought alternately into a loading position and into a traveling position.

With the ramp in the loading position, the stroller may be more easily loaded into the motor vehicle. In the traveling position, the ramp may be carried without restrictions and thus is ready to use at any point.

In a further advantageous embodiment of the motor vehicle according to the disclosure, the motor vehicle is configured as a minivan.

In particular, this class of vehicle benefits from a design of the docking station according to the disclosure, since this class of vehicle, which generally has a length of less than 4.10 m, comprises a trunk into which a stroller, in particular a baby carriage, fits inside only when dismantled and/or folded up.

In a further advantageous embodiment of the motor vehicle according to the disclosure, the motor vehicle is configured such that it does not comprise a B-pillar on least on one vehicle side.

Thus, the lateral opening is considerably enlarged and loading and boarding is possible in a much more convenient manner.

The stroller according to the disclosure is configured as a baby carriage. Said stroller has a design, which corresponds to the above-described docking station, such that the stroller is able to be docked onto the docking station.

Thus, a baby carriage that is compatible with the docking station according to the disclosure is advantageously provided.

Further advantages of the present disclosure will become apparent from the detailed description and the illustrations. The disclosure is described in more detail with reference to the illustrations and the following description. In the drawings:

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
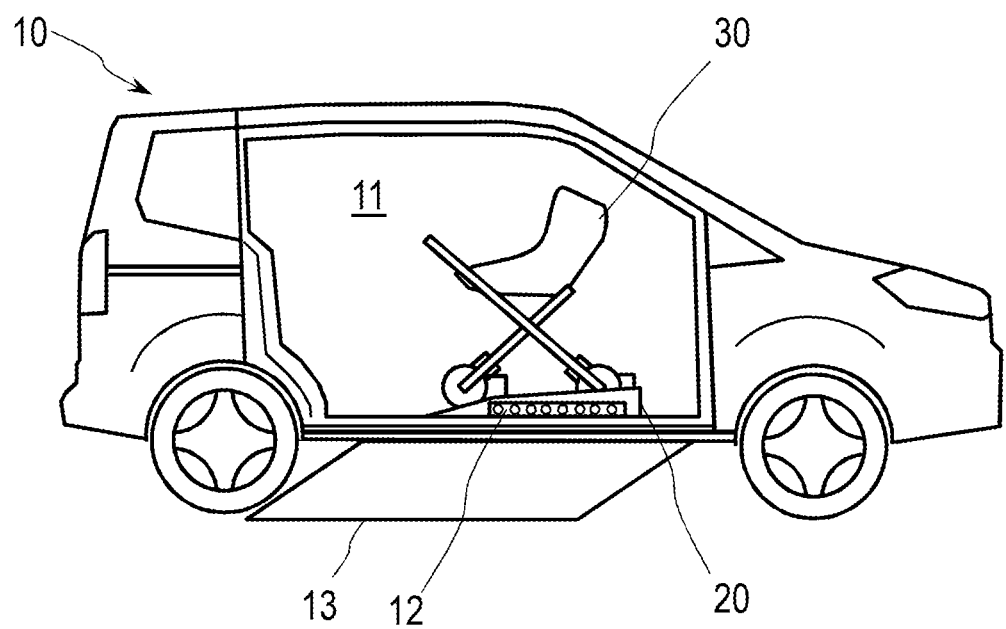
FIG. 1 shows a motor vehicle according to the disclosure in an exemplary embodiment.

In FIG. 1, the motor vehicle 10 according to the disclosure is shown schematically in an exemplary embodiment. The motor vehicle 10 in this case is shown without side doors for improved clarity. The motor vehicle 10 is designed, in particular, as a minicamper, minivan, van or the like, wherein minivan in this case is assigned to the B-segment and has a vehicle length of up to approximately 4.10 m. The motor vehicle 10 in this case has front doors and a rear door on at least one vehicle side. The at least one rear door is configured, in particular, as a sliding door. Alternatively, the at least one rear door may be designed such that said rear door opens in an opposing direction to the front door. The motor vehicle 10 is configured, in particular, such that a B-pillar is not configured at least on a side that the rear door is arranged, and the motor vehicle is, therefore, without B-pillars. In the embodiment illustrated in FIG. 1, the motor vehicle 10 is a minivan with rear sliding doors (not shown) and configured to be without B-pillars.

The motor vehicle 10 comprises, in particular, a ramp 13. The ramp 13 is able to be moved at least into a traveling position and a loading position. In the traveling position, the ramp 13 is folded up and/or pushed in the motor vehicle 10, and the motor vehicle 10 is ready for travel. In the loading position, the ramp 13 forms an oblique plane that, in particular, extends from ground to a passenger compartment 11 of the motor vehicle 10. The ramp 13 has, in particular, an electrical drive that is configured to drive the ramp 13 alternately into the loading position and the traveling position.

As is usually the case, the motor vehicle 10 has a passenger compartment 11, traveling passengers remaining therein during a journey in the motor vehicle 10. The motor vehicle 10 has at least one seat receiver 12 that is configured to receive a seat and fasten said seat in the passenger compartment 11. The seat receiver 12 comprises, in particular, at least one seat rail, preferably two seat rails.

The motor vehicle 10 according to the disclosure additionally comprises a docking station 20. The docking station 20 is configured to receive a stroller 30, in particular a baby carriage. The docking station 20 is, in particular, fastened to the seat receiver 12 of the motor vehicle 10, in particular the docking station 20 is fastened to the seat receiver 12 of a passenger seat, i.e. instead of a passenger seat adjacent to a driver's seat. The docking station 20 is fastened, in particular, such that said docking station is able to be displaced in a longitudinal direction of the motor vehicle 10 in the manner of a passenger seat. The docking station 20 is mounted, in particular, on the seat rails.

The motor vehicle 10, as is usually the case, has an electrical, on-board power supply. The docking station 20 is preferably electrically connected to the on-board power supply.

The motor vehicle 10 is configured, in particular, to identify that the docking station 20 is mounted instead of a seat and/or that a stroller 30 is docked in the mounted docking station 20 and, as a result, to adapt at least one control unit, in particular an airbag control unit, such that the passenger airbag is deactivated.

Figure 3:
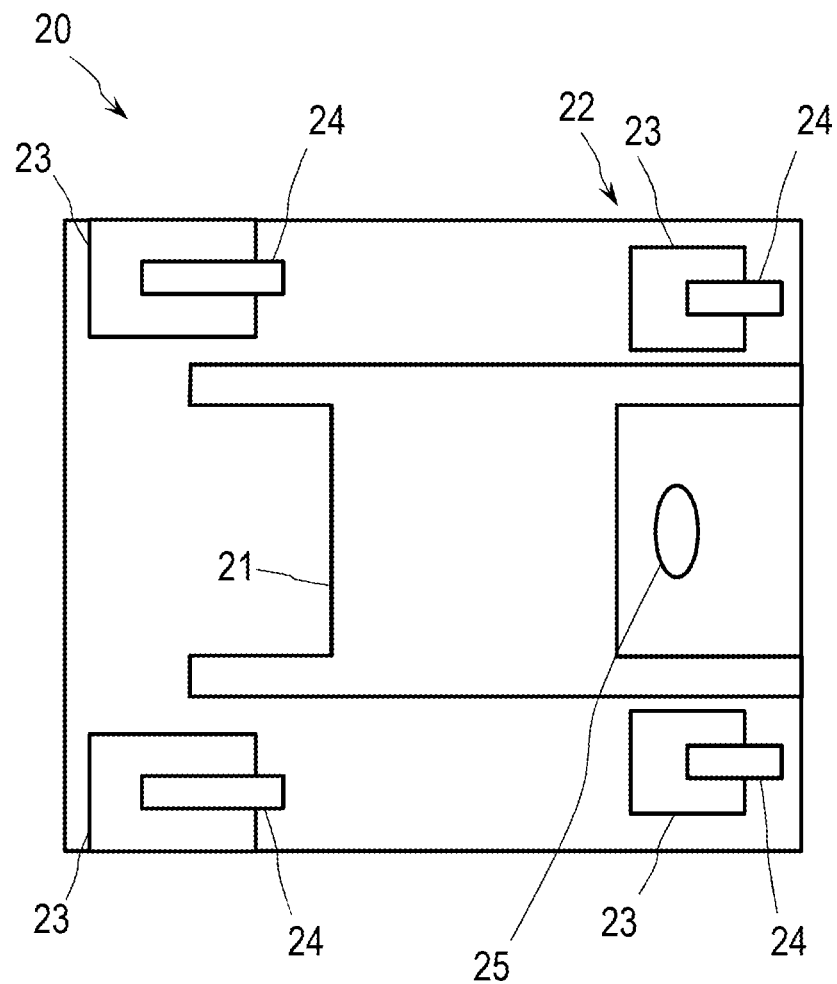
FIG. 3 shows a docking station according to the disclosure in an exemplary embodiment.

The docking station 20 according to the disclosure is shown schematically in FIG. 3 in an exemplary embodiment. The docking station 20 comprises a fastening device 21 that is configured to fasten the docking station 20 to the seat receiver 12 of the motor vehicle 10. The fastening device 21 in this case is designed, in particular, such that the docking station 20 is displaceable in a longitudinal direction of the motor vehicle 10. In particular, the fastening device 21 is designed to fasten to a seat rail, in particular to two seat rails of the seat receiver 12.

Moreover, the docking station 20 has a receiving apparatus 22 that is configured to receive the stroller 30. The receiving apparatus 22 comprises, in particular, at least one positioning device 23 and at least one fixing device 24. The positioning device 23 is configured to move the stroller 30 into a docked position. To this end, the positioning device 23 preferably comprises recesses that receive wheels of the stroller 30. The fixing device 24 is configured to fasten the stroller 30 in a reversible manner. The fixing device 24 is configured, in particular, such that the stroller 30 is fastened by a positive connection, in particular to axles 32, 33 of the stroller 30. Alternatively, it is possible for the stroller 30 to be fastened on a different point of the stroller chassis 31. The receiving apparatus 22 may be additionally configured to fix the stroller 30 to a coupling element 35 fastened thereto.

In the embodiment shown in FIG. 3, the receiving apparatus 22 comprises four positioning devices 23 and four fixing devices 24 for a four-wheeled stroller 30, wherein the wheels are designed as twin wheels. In this case, the fixing devices 24 respectively engage between the twin wheels. The receiving apparatus 22 is preferably configured such that the stroller 30 is able to be fixed both to a front axle 32 and a rear axle 33. If the stroller 30 is positioned and fixed, then it is docked.

Optionally, the docking station 20 comprises an electrical connection 25, a docked stroller 30 being able to be connected thereby to the on-board power supply of the motor vehicle 10. In particular, the docking station 20 is configured such that the electrical connection is produced at the same time when the stroller 30 is docked.

The docking station 20 is configured, in particular, to provide information about a docking station status to the motor vehicle 10. The status may encompass a mounting status that indicates whether the docking station 20 is mounted in the motor vehicle 10 and/or may encompass a docking status that indicates whether a stroller 30 is docked onto the docking station 20.

Figure 2:
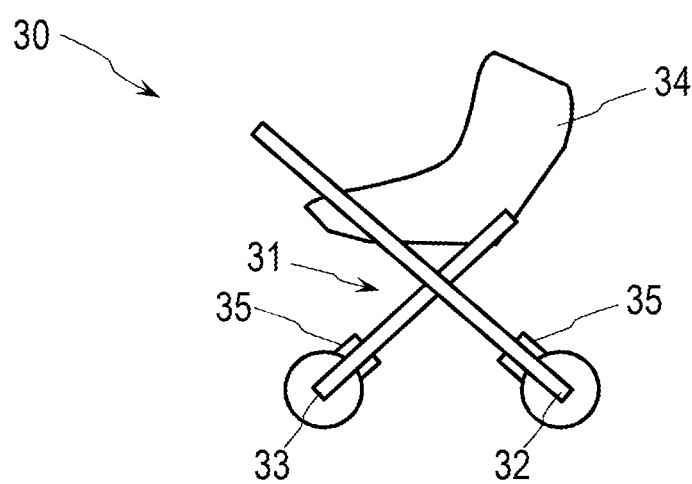
FIG. 2 shows a stroller according to the disclosure.

The stroller 30 according to the disclosure is shown schematically in FIG. 2 in an exemplary embodiment. The stroller 30 according to the disclosure is configured as a baby carriage which, in particular, comprises a chassis 31 with a front axle 32 and a rear axle 33, having, in each case, at least one wheel. The wheels are designed, in particular, as twin wheels. In particular, a child seat 34 is assigned to the chassis 31. The child seat 34 has, in particular, seat belts that secure a child to be transported. The stroller 30 according to the disclosure has a design corresponding to the docking station 20, so that the stroller 30 is able to be docked onto the docking station 20. To this end, the stroller 30 may comprise at least one coupling element 35 that is preferably able to be connected by a positive connection to the fixing device 24 of the docking station 20.

The stroller 30 comprises, in particular, an electrical device, which comprises a rechargeable battery. The electrical device, for example, is an electromotive pushing aid, a heated handgrip, or the like. The stroller 30 is designed such that the electrical device is able to be connected to the electrical connection 25 of the docking station 20 so that a rechargeable battery (not shown) may be charged up. In particular, the stroller 30 is configured such that the electrical device of the stroller 30 is connected to the electrical connection 25 when the stroller 30 is docked onto the docking station 20.

Whilst in detail the disclosure has been illustrated and described further by the preferred exemplary embodiments, the disclosure is not limited by the disclosed examples and other variants may be derived therefrom by the person skilled in the art without departing from the protected scope of the disclosure.

The figures are not necessarily accurate in terms of detail and scale, and may be shown enlarged or reduced in size in order to provide an improved overview. Therefore, the functional details which are disclosed herein are not to be understood as limiting but merely as an illustrative basis which provides guidance to the person skilled in the art in this technological field in order to implement the present disclosure in many different ways.

The expression "and/or" used here, when it is used in a series of two or more elements, means that each of the elements set forth may be used individually or any combination of two or more of the elements set forth may be used. If, for example, a combination is described that it contains the components A, B and/or C, the combination A individually; B individually; C individually; A and B in combination; A and C in combination; B and C in combination; or A, B and C in combination may be obtained.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A stroller comprising:
    at least one seat receiver having at least one seat rail being arranged within a passenger compartment of a vehicle fastened, via a fastener, to a passenger seat, the passenger seat being configured to receive the stroller on a side that a rear door is arranged in an absence of a B-pillar; and
    a docking station having a control unit configured to provide information about a stroller mounting and docking status via an electrical connection that connects to a power supply such that the stroller is docked onto the docking station via a ramp configured to move between loading and traveling positions.

2. The stroller as claimed in claim 1, wherein the docking station is arranged on the passenger seat.

3. The stroller as claimed in claim 1, wherein the power supply, via the electrical connection, connects to the stroller to power a rechargeable battery of the stroller.

4. The stroller as claimed in claim 1, wherein the vehicle is a minivan.

5. The stroller as claimed in claim 1, wherein the power supply is an on-board power supply of the vehicle.

6. A motor vehicle comprising:
    a seat rail arranged within a passenger compartment of the motor vehicle and configured to receive a passenger seat, the passenger seat configured to receive a stroller; and
    a docking station mounted to the seat rail and having a control unit configured to provide information about a mounting and docking status of the stroller via an electrical connection that connects to a power supply of the motor vehicle.

7. The motor vehicle as claimed in claim 6, wherein the docking station is arranged on the passenger seat.

8. The motor vehicle as claimed in claim 6 further comprising a ramp that is able to be brought, alternately, into a loading position and a traveling position.

9. The motor vehicle as claimed in claim 8, wherein the ramp has an electrical drive that is configured to drive the ramp into the loading position and the traveling position.

10. The motor vehicle as claimed in claim 6, wherein the motor vehicle is a minivan.

11. The motor vehicle as claimed in claim 6, wherein the passenger compartment is configured such that the motor vehicle does not include a B-pillar on at least one vehicle side that a rear door is arranged.

12. The motor vehicle as claimed in claim 6, further comprising a motor vehicle control unit configured to provide instruction to perform at least one of: (i) prompt a driver to adopt a smoother driving mode, and (ii) adapt a noise level of a radio.

13. A docking station comprising:
    a fastening device, which is configured to fasten the docking station to a seat receiver of a motor vehicle, wherein the fastening device is configured to be fastened to the seat receiver having at least one seat rail; and
    a receiving apparatus configured to receive a stroller.

14. The docking station as claimed in claim 13 further comprising an electrical connection, wherein the stroller is able to be connected, via the electrical connection, to an on-board power supply of the motor vehicle.

15. The docking station as claimed in claim 14 further comprising a control unit configured to provide information about a stroller mounting status or docking status via the electrical connection.

16. The docking station as claimed in claim 14, wherein the electrical connection connects the power supply to a rechargeable battery of the stroller.

17. The docking station as claimed in claim 13, wherein the receiving apparatus has at least one positioning device to move the stroller into a docked position.

18. The docking station as claimed in claim 17, wherein the positioning device has a series of recesses to receive wheels of the stroller.

19. The docking station as claimed in claim 13, wherein the receiving apparatus has at least one fixing device to fasten the stroller in a reversible manner.

20. The docking station as claimed in claim 19, wherein the at least one fixing device is configured to fasten the stroller by a positive connection to at least one of: an axle of the stroller, a chassis of the stroller, and a coupling element fastened to the stroller.

* * * * *